(12) United States Patent
Simon et al.

(10) Patent No.: US 7,266,507 B2
(45) Date of Patent: *Sep. 4, 2007

(54) TIME-BASED DISABLEMENT OF EQUIPMENT

(75) Inventors: Franklin C. Simon, Bonsall, CA (US); Michael P. Simon, Fallbrook, CA (US); Ronald Mueller, Bonita, CA (US)

(73) Assignee: Payment Protection Systems, Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/804,299

(22) Filed: Mar. 19, 2004

(65) Prior Publication Data

US 2004/0176978 A1 Sep. 9, 2004

Related U.S. Application Data

(63) Continuation of application No. 09/397,132, filed on Sep. 16, 1999, now abandoned, which is a continuation-in-part of application No. 09/371,697, filed on Aug. 10, 1999, now Pat. No. 6,195,648.

(51) Int. Cl.
*G06Q 40/00* (2006.01)
(52) U.S. Cl. .............................. 705/1; 705/35
(58) Field of Classification Search ...................... None
See application file for complete search history.

(56) References Cited

U.S. PATENT DOCUMENTS

| | | | |
|---|---|---|---|
| 3,665,397 A | 5/1972 | De Napoli et al. | |
| 3,790,933 A | 2/1974 | Cort | |
| 3,987,408 A | 10/1976 | Sassover et al. | |
| 4,067,411 A | 1/1978 | Conley et al. | |
| 4,177,466 A | 12/1979 | Reagan | |
| 4,291,237 A | 9/1981 | Kitano | |
| 4,327,353 A | 4/1982 | Beard et al. | |
| 4,335,370 A | 6/1982 | Scalley et al. | |
| 4,366,466 A | 12/1982 | Lutz | |

(Continued)

FOREIGN PATENT DOCUMENTS

EP 0320470 A1 6/1989

(Continued)

OTHER PUBLICATIONS

Article: "Pager Lets You Locate Your Car, Unlock and Start It," Dec. 22, 1997, *USA Today*.

(Continued)

*Primary Examiner*—John Weiss
*Assistant Examiner*—Michael Fisher
(74) *Attorney, Agent, or Firm*—Buchanan Ingersoll & Rooney PC

(57) ABSTRACT

A disabling module in communication with a control module operates to disable or partially disable equipment in response to the failure of a user to complete a specific task, such as make a loan or lease payment. When a user makes a payment on an outstanding loan, usually a loan related to specific equipment, such as a motorized vehicle, a control module is notified of the payment. The control module causes the equipment to be enabled or disabled in accordance with payment receipt.

45 Claims, 3 Drawing Sheets

U.S. PATENT DOCUMENTS

| | | |
|---|---|---|
| 4,381,705 A | 5/1983 | Roes et al. |
| 4,463,340 A | 7/1984 | Adkins et al. |
| 4,553,511 A | 11/1985 | Hayakawa et al. |
| 4,616,208 A | 10/1986 | Nakamura |
| 4,624,578 A | 11/1986 | Green |
| 4,630,201 A | 12/1986 | White |
| 4,700,296 A | 10/1987 | Palmer et al. |
| 4,777,377 A | 10/1988 | Jeter |
| 4,804,937 A | 2/1989 | Barbiaux et al. |
| 4,805,722 A | 2/1989 | Keating et al. |
| 4,926,332 A | 5/1990 | Komuro et al. |
| 4,990,890 A | 2/1991 | Newby |
| 4,995,086 A | 2/1991 | Lilley et al. |
| 5,023,605 A | 6/1991 | McColl |
| 5,089,762 A | 2/1992 | Sloan |
| 5,124,920 A | 6/1992 | Tamada et al. |
| 5,276,728 A | 1/1994 | Pagliaroli et al. |
| 5,289,369 A | 2/1994 | Hirshberg |
| 5,291,554 A | 3/1994 | Morales |
| 5,396,215 A | 3/1995 | Hinkle |
| 5,490,200 A | 2/1996 | Snyder et al. |
| 5,491,325 A | 2/1996 | Huang et al. |
| 5,495,531 A | 2/1996 | Smiedt |
| 5,510,780 A | 4/1996 | Norris et al. |
| 5,519,260 A | 5/1996 | Washington |
| 5,594,284 A | 1/1997 | Hill et al. |
| 5,602,426 A | 2/1997 | Ecker |
| 5,631,962 A | 5/1997 | Balph et al. |
| 5,661,451 A | 8/1997 | Pollag |
| 5,665,397 A | 9/1997 | Fisher et al. |
| 5,686,765 A | 11/1997 | Washington |
| 5,715,905 A | 2/1998 | Kaman |
| 5,775,290 A | 7/1998 | Staerlz et al. |
| 5,812,067 A | 9/1998 | Bergholz et al. |
| 5,812,252 A | 9/1998 | Bowker et al. |
| 5,819,869 A | 10/1998 | Horton |
| 5,841,363 A | 11/1998 | Jakob et al. |
| 5,850,599 A * | 12/1998 | Seiderman .................. 455/406 |
| 5,867,802 A | 2/1999 | Borza |
| 5,912,512 A | 6/1999 | Hayashi et al. |
| 5,917,405 A * | 6/1999 | Joao ...................... 340/426.17 |
| 5,930,777 A | 7/1999 | Barber |
| 5,942,985 A | 8/1999 | Chin |
| 5,945,906 A | 8/1999 | Onuma |
| 5,964,877 A | 10/1999 | Victor et al. |
| 5,969,633 A | 10/1999 | Rosler |
| 5,973,411 A | 10/1999 | Tado et al. |
| 6,025,774 A | 2/2000 | Forbes |
| 6,043,568 A | 3/2000 | Matsumoto et al. |
| 6,043,752 A | 3/2000 | Hisada et al. |
| 6,073,064 A | 6/2000 | Konrad et al. |
| 6,157,317 A | 12/2000 | Walker |
| 6,195,648 B1 * | 2/2001 | Simon et al. .................. 705/40 |
| 6,259,168 B1 | 6/2001 | Okada |
| 6,380,848 B1 | 4/2002 | Weigi et al. |
| 6,611,201 B1 | 8/2003 | Bishop et al. |
| 6,647,328 B2 * | 11/2003 | Walker ....................... 701/36 |
| 6,664,888 B1 | 12/2003 | Bishop |
| 2004/0177034 A1 | 9/2004 | Simon et al. |

FOREIGN PATENT DOCUMENTS

| | | |
|---|---|---|
| EP | 635408 A1 | 1/1999 |
| JP | S58-180349 | 10/1983 |
| WO | 96/19360 | 6/1989 |
| WO | 96/16845 | 6/1996 |

OTHER PUBLICATIONS

Article: "Electronic Keys Keep Tabs on Late Payers," Dec. 22, 1997, *Nonprime Auto News*.

"PASSTEC Device Safety Prevents Vehicles from Starting," Jul. 19, 1999, *Used Car News*.

Payment Clock Disabler advertisement (obtained from Internet, published on May 18, 1998).

Payment Clock Disabler advertisement (obtained from Internet, archived on Jan. 28, 1999).

Bohn, "Anti-theft systems attract dealers", Automotive News, p. 57. Dialog File 16, Access No. 02727658. Feb. 1993.

White, J., "Repo Man's good news is bad for others—rise in delinquent car loans portends slowdown", Wall Street Journal, New York. Nov. 1988.

Edgarton, J., "This antitheft device may cut your car insurance bill by up to 25%", Money, New York. Nov. 1997.

Brewer, D., "Bad loans and legal remedies", Credit Union Management, Madison, Abstract, p. 22. Apr. 1996.

Royal News Corp., "Elite to Unveil High-Tech Car Tracking, Monitoring System", Nonprime Auto News, pp. 1 and 9 vol. 3, No. 7. Feb. 8, 1999.

\* cited by examiner

TIME-BASED DISABLEMENT OF EQUIPMENT

RELATED APPLICATIONS

This application is a Continuation of U.S. application Ser. No. 09/397,132, entitled "Time-Based Disablement of Equipment", filed on Sep. 16, 1999 now abandoned, which is a Continuation-in-Part of U.S. patent application Ser. No. 09/371,697, entitled "Loan Repay Enforcement System" filed on Aug. 10, 1999 now U.S. Pat. No. 6,195,648, each of which are incorporated by reference here in their entirety.

BACKGROUND OF THE INVENTION

The present invention is related to systems and methods for disabling equipment in response to the failure of a user to perform a specific task. More particulary, the present invention is related to systems and methods that disable a vehicle in response to the failure of a user to enter a code that corresponds with a stored code in the vehicle.

Typically, monthly payments to utility companies are made with very high reliability. This is partly due to the threat of service cut-off. For example, failure to pay a telephone bill will result in loss of telephone services. Thus, telephone bills are paid regularly because failure to do so has immediate and tangible results. Monthly payments on an automobile loan, for example, are not likely to be as regular. Although an automobile may be repossessed, the process is expensive and complex. Thus, the threat of repossession is less immediate than telephone service cut-off. To encourage reliable loan re-payments, it is desirable to have a "service" cut-off for equipment subject to the loan, such as an automobile.

Conventional systems to encourage reliable loan re-payments interrupt the ignition system of an automobile on a regular, timed interval. To re-enable the automobile, a user is required to return to a payment center, make a payment, and have an agent reset the interrupt mechanism for a renewed timed interval. The system can only be reset by an authorized agent as it requires a key held in escrow at the payment center. While such a system is effective in encouraging users to repay their loans in a timely fashion, it has extreme overhead considerations. For example, the system requires a user to travel to the payment center each payment period of the loan in order to re-enable the automobile. In addition, a user must arrive at the payment center during its customer service hours. Still further, a user may have to wait to receive the attention of the first available agent at the payment center. As these problems pose considerable inconvenience, it is further desirable for a system and method that can reset the timed interval without the need for the user to travel to the payment center.

SUMMARY OF THE INVENTION

A disabling module in communication with a control module operates to disable or partially disable equipment in response to the failure of a user to complete a specific task, such as make a loan or lease payment. When a user makes a payment on an outstanding loan, usually a loan related to specific equipment, such as a motorized vehicle, a control module is notified of the payment. The control module causes the equipment to be enabled or disabled in accordance with payment receipt.

In an exemplary embodiment of the present invention, when a user makes a payment on an outstanding automobile loan or lease agreement, a code is released to the user. The user then operates a user-operator interface connected to the control module to convey the code. Once the code is verified, the control module enables the automobile.

In another exemplary embodiment of the present invention, the control module causes the ignition circuit in the automobile to be disabled if loan or lease payments are not timely made. The user operates a user interface in order to convey the code to the control module. Upon verification, the control module enables the ignition circuit in order to allow the user to operate the automobile. Thus, it becomes possible to interrupt service of equipment in response to the failure to timely receive payments on a loan associated with the equipment.

According to a first aspect of the present invention, provided is a method of enabling and disabling equipment in response to payments being timely made. The method comprises the steps of computing a payment due deadline; generating a reference code which corresponds to the deadline; providing the reference code to a comparator; receiving an additional code; passing the additional code to the comparator; comparing the additional code with the reference code; disabling the equipment if agreement between the additional code and the reference code is not detected prior to the payment due deadline; and enabling the equipment if agreement between the additional code and the reference code is detected.

According to a further aspect of the invention, provided is a system for enabling and disabling equipment in response to timely payments being made. The system comprises a disabling module connected to the equipment; a control module in communication with the disabling module; and means for periodically receiving a code and transmitting the code to the control module.

According to a further aspect of the invention, provided is a method for enabling and disabling equipment. The method comprises the steps of computing at least one deadline; generating a first code for each at least one deadline; receiving a second code; comparing the first code with the second code; disabling the equipment if the comparing step determines that the first code and the second code are not in agreement prior to the at least one deadline; and enabling the equipment if the comparing step determines that the first code and the second code are in agreement.

According to a further aspect of the invention, provided is a system for enabling and disabling equipment. The system comprises a disabling module connected to the equipment; a control module in communication with the disabling module; and means for periodically receiving a code and transmitting the code to the control module, wherein the disabling module disables the equipment when the code is not in agreement with a reference code before a predetermined time exceeds a predetermined deadline.

In another exemplary embodiment, a user who purchases or leases an automobile from a dealer agrees to have an apparatus employing the disabling system and method of the present invention installed on the purchased automobile in order to protect the lender from late and/or missed payments on an outstanding loan or lease. Upon initiation, parameters that relate to loan or lease terms, for example, the total number of payments, payment interval, and codes that correspond to payment deadlines are loaded into a memory contained in the apparatus from a server unit. The control module, for example, computes a loan repayment schedule, stores the payment deadlines for the life (or at least a part of the life) of the loan in the memory, and either stores codes, or creates and stores codes (if the codes were not loaded from the server unit), that correspond to the payment deadlines. When a user makes a payment on time in agreement with the terms of the loan, the payment agency (or dealer) releases, for example, a predetermined alpha-numeric code to the user. The user then enters the code via a user interface so that the control module can process the code for verification. If the code matches a reference code stored or generated within the apparatus, then the control module enables the automobile by, for example, enabling the ignition system of the automobile. A user who fails to make a payment will not receive the code necessary to enable the automobile. If the user fails to enter the proper code by the time the deadline passes, the automobile is disabled until payment is made. Thus, the control module is provided an indication that a timely payment was made via receipt of the correct code.

It is an object of the present invention to provide systems to improve timely payments for loan or lease agreements.

It is a further object of the present invention to provide a system which can be operated without having to bring equipment to a predetermined location.

It is a further object of the present invention to provide systems to enable and disable equipment in response to receipt of loan or lease payments.

It is a further object of the present invention to the provide systems that disable or partially disable equipment in response to a failure to receive a code in due time.

A better understanding can be had with reference to the detailed description of preferred embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWINGS

These and other features, aspects, and advantages of the present invention will become better understood with regard to the following description, appended claims and drawings where:

DETAILED DESCRIPTION

In accordance with each of the exemplary embodiments of the invention, there is provided apparatus for and methods of a time-based disablement of equipment. It will be appreciated that each of the embodiments described include both an apparatus and a method and that the apparatus and method of one exemplary embodiment may be different than the apparatus and method of another exemplary embodiment.

Figure 1:
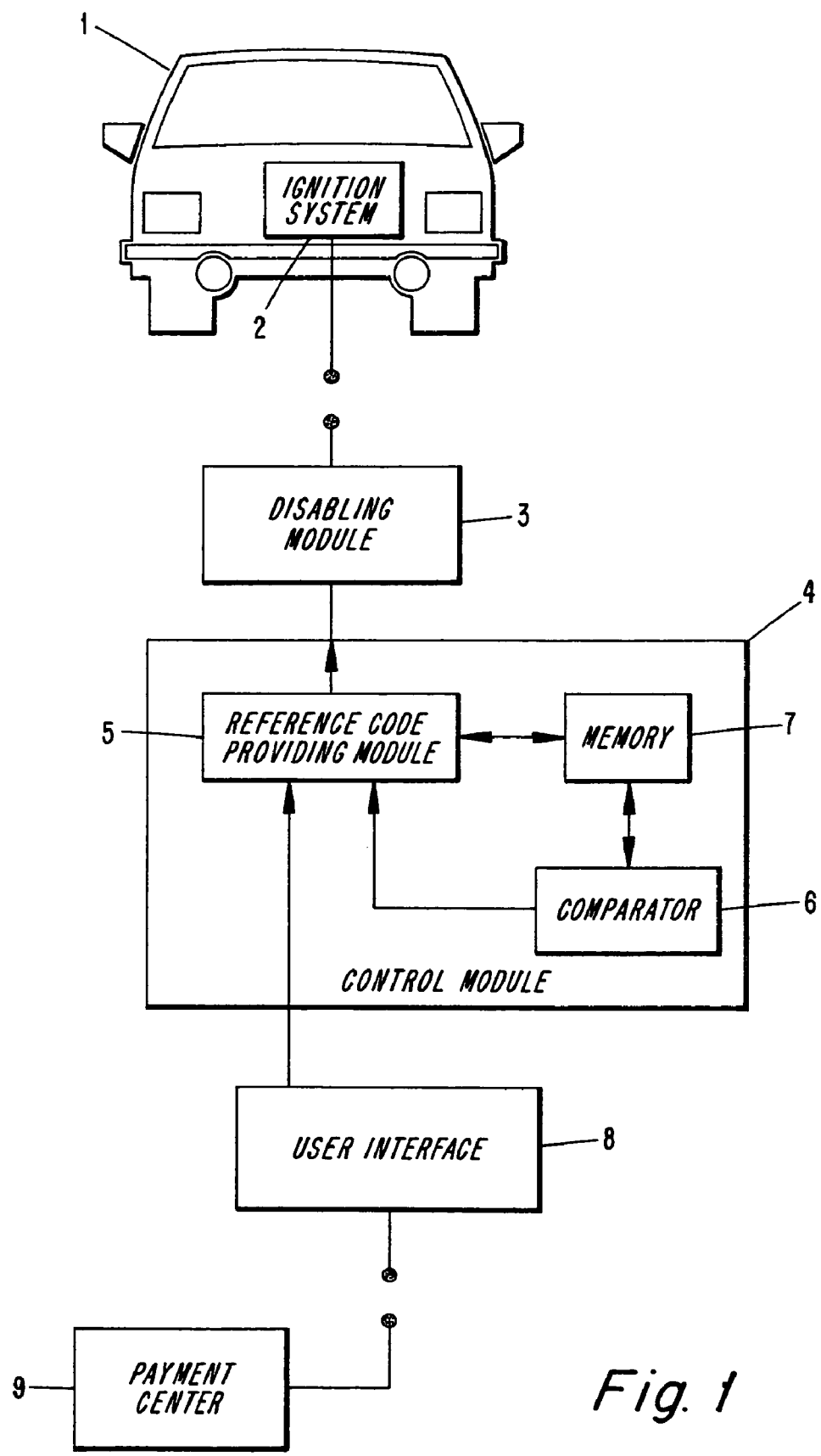
FIG. 1 is a block diagram which describes an arrangement of elements in an exemplary system of the present invention.

FIG. 1 illustrates a block diagram of basic apparatus of the invention. An automobile 1 having a standard ignition system 2 is in electrical communication with a device of this invention. The device comprises a disabling module 3 in communication with a control module 4 including a reference code providing module 5, a comparator 6, and a memory 7 and is further in communication with a user interface 8. The memory 7 can, for example, include a programmable memory such as RAM or an EEPROM, and/or the memory can include a static memory such as a ROM. The memory 7 can, for example, be programed (and re-programed) by a computer or processor, or by a handheld or portable device that has been programmed by a computer or processor. The link between the control module 4 and the computer or handheld device can be via cable, telephone, radio frequency, or any known transmission medium.

A payment center 9 which provides codes to a user is also illustrated. The payment center 9 is a facility for receiving payments and dispensing codes in response to the receipt of payments. It can be automatic or partially automatic, whereby the use of a database and dial-up access with electronic communication or radio frequency transmission of codes is employed. Although the automobile 1 and payment center 9 are not considered elements of apparatus taught here, they relate intimately therewith. Thus, they are shown via their relationship with elements of the apparatus.

In an exemplary embodiment of the present invention, the disabling module 3 includes an ignition interruption circuit that is coupled to ignition wires leading from a standard ignition keyswitch of an automobile. In one exemplary embodiment, the disabling module 3 includes a circuit breaking switch. Arranged serially, either the disabling module 3 or the keyswitch will operate to cause an open circuit in the ignition wires, rendering the ignition of the automobile disabled. The disabling module 3 is in further communication with the control module 4. The control module 4 operates the disabling module 3 by sending commands to direct the disabling module 3 to take either of two alternative states. A "disabled" state corresponds to an "open" ignition circuit while an "enabled" state corresponds to a "closed" ignition circuit. The control module 4 causes the disabling module 3 to switch between these two states.

As used herein, the terms "disable" or "disabling" are intended to encompass both total and partial disablement. In exemplary embodiments of the present invention, the disabling module can disable a critical component or system of the equipment. For example, in an automobile, a critical component or system can be the brakes, the fuel pump, and/or the ignition circuit. Additionally or alternatively, the disabling module can partially disable the equipment by altering the operation of the equipment so as to provide a significant inconvenience to the user. For example, in an automobile, the disabling module can prevent the automobile from exceeding a predetermined speed limit such as 5–15 miles per hour and/or limit the fuel supply to the engine. Additionally or alternatively, the disabling module can cause the steering wheel to lock, can move the driver's seat to an undrivable position, can disable power steering, can disable the air conditioner, and/or can disable the radio and other accessories in the automobile.

In an alternative embodiment of the present invention, the disabling module 3 can disable or partially disable the automobile by, for example, stopping the flow of fuel supplied to the engine, gradually reducing the amount of fuel supplied to the engine (if the automobile is moving), engaging the brakes or parking brake of the automobile, gradually applying the brakes of the automobile (if the automobile is moving), and/or opening the ignition circuit loop to simulate the removal of the ignition key.

A user interface is coupled to the control module in order to convey to it a code. An alpha-numeric type code such as a PIN number, for example, may be transmitted from the user interface to the control module for comparison to a reference code. The code can be any combination of numbers and letters or even symbols that can be represented in a digital domain such as in ASCII format. While the exemplary embodiments of the invention include a keypad for tactile entry of a numeric code by a user, other versions are possible. For example, tumbler combination locks, slider element devices, and point-and-click user interfaces can be used to convey a code to the control module. A user interface allows a user who receives codes from, for example, a payment center, to enter those codes and transmit them to the control module for comparison.

The control module 4 can be a logic processing unit, a conventional microcontroller or, alternatively, may be a custom designed microcircuit having specific application. Although the control module can be distinct from support elements such as a memory, for purposes of this disclosure "control module" is used to refer to the entire computing facility which may include a memory, a comparator and other support elements.

FIG. 1 illustrates this relationship where a reference code providing module 5 and a comparator 6 are presented within the bounds of the control module 4. The control module 4 can include other support elements such as power supply control, read-only memory, input-output facility and other elements typically used in conjunction with microcontrollers or microprocessors.

A grace period may be included as part of the deadline for payment. Under terms of the loan or lease agreement, a payment becomes due at some discrete time. However, because of inconsistencies in the mail or other payment transmission difficulties, the present invention can be arranged to provide a grace period. A grace period allows equipment to operate normally after the time for payment has past but where no payment has been received, recorded, and reported via entry of a code. During the grace period, various indications and warnings can be provided to a user at the equipment. For example, a display can be arranged to deliver a message which indicates impending interruption. Additionally or alternatively, an audio signal or other alarm can be provided to alert a user to the condition that payment is overdue.

One will appreciate that in rare cases of emergency, provision for override may be useful. For example, if an automobile is disabled for lack of timely payment, then a special code to be used only in case of an emergency may temporarily re-enable the automobile. Thus, a person in dire need of medical help may be transported with an otherwise disabled automobile when the emergency code is employed. By agreement, one can be charged heavy fines for misuse of emergency codes. In addition, the number of emergency code uses can be limited to a fixed amount within a given time period, for example, two or three times in a month. In this way, non-emergency use is highly discouraged. The system is made secure against use outside designed limits while still accommodating occasional emergencies.

Fraudulent attempts to enable equipment may be accompanied by surreptitious entry of random codes. This can easily be detected at the control module and devices of the invention can be arranged to respond. When a predetermined number of bad code entries is detected, the system can be made to block further entry of codes. For example, when three consecutive bad codes are attempted, the system can be made to ignore further entry for a predetermined amount of time.

In alternative embodiments of the present invention, the user interface receives the code from a radio frequency identification (RFID) transponder, a magnetic strip card, a bar code card, a smart card, and/or other device that contains a code which can be communicated to the user interface equipped with the appropriate hardware to receive the code. In another alternative embodiment of the present invention, codes are received from the payment center and are stored in a portable device. The code can be stored in the portable device by, for example, a wire, wireless interface, and/or acoustic interface. The user interface can receive the code from the portable device by, for example, direct coupling of the portable device to the user interface, or by a wireless link, such as radio frequency (RF) or infrared (IR) signal.

Figure 2:
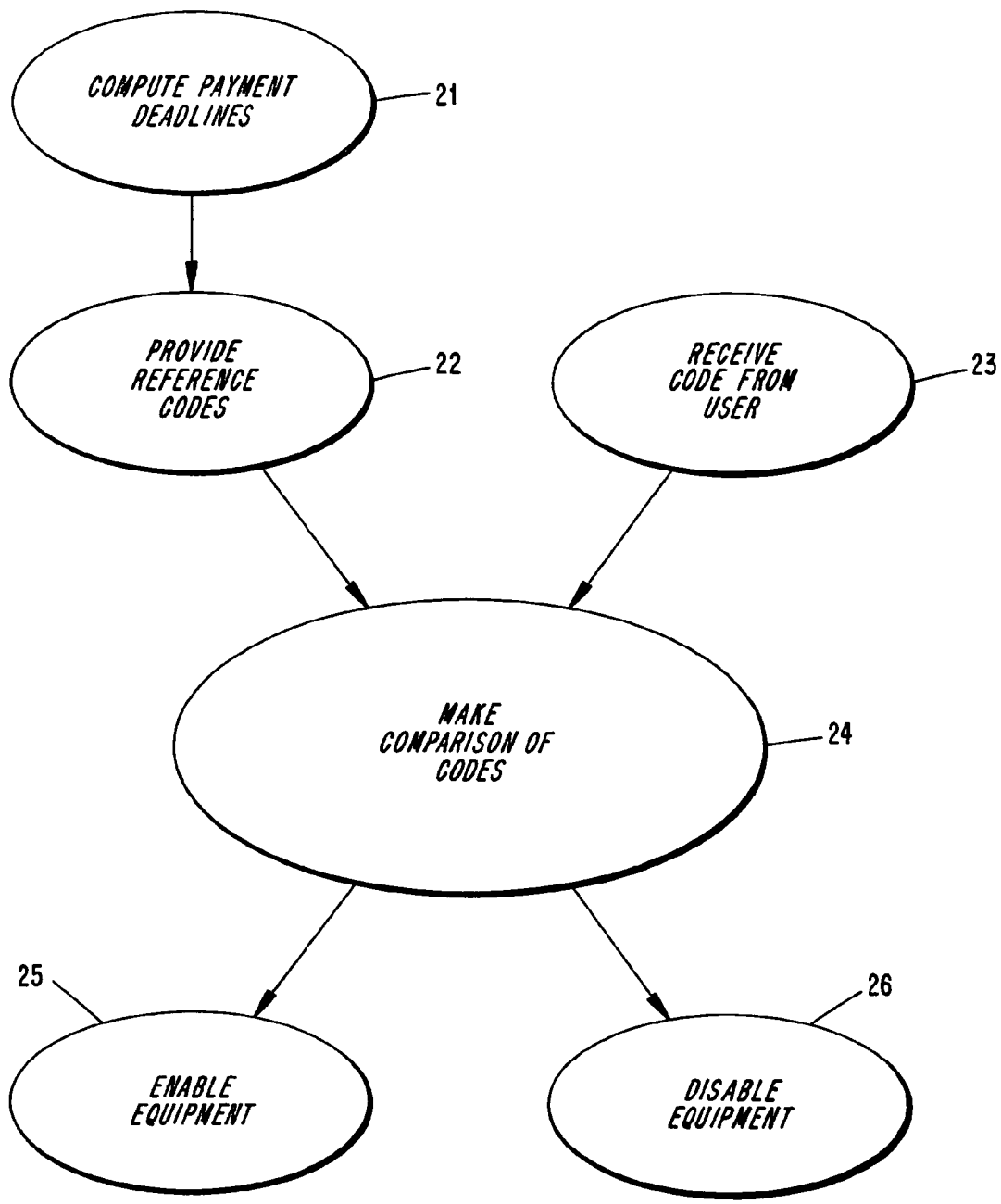
FIG. 2 is a block diagram which describes an arrangement of steps in an exemplary method of the present invention.

With reference to FIG. 2, exemplary methods of the invention include a step to compute a plurality of payment deadlines 21. In agreement with payment terms of a loan or lease agreement, a plurality of deadlines for receipt of payments is provided.

Information, for example, relating to date and time of loan initialization, lifetime of the loan, total number of payments to be made, payment frequency, grace period, emergency override code, and perhaps other information (e.g., re-enable, reset procedures), is used for computing payment deadlines. A payment deadline represents the time by which a payment must be received at a payment center in order that the terms of the loan be met. Payment deadlines may be computed at initialization of the (loan) system or may be computed at various times thereafter. In either case, deadlines computed can be used to generate reference codes.

In exemplary embodiments of the invention, a host/client relationship is established with regard to computing facility. A host that can run software appropriate for systems administration can be connected to a client computing apparatus for downloading of important data like code schemes and particular deadlines. After initialization operations, the host can be separated from the client where the client has been programmed with important code information.

A control module includes the ability to provide reference codes that correspond to computed deadlines. Algorithms used to generate reference codes are known to the payment center which supplies corresponding codes to a user. In an exemplary embodiment of the present invention, the reference code provider can be arranged to store an array of reference codes generated in a set-up procedure during initialization of the system. The reference codes are then periodically recalled from the memory for a comparison step. As an alternative, it the reference code providing module generates reference codes in real time in agreement with a predetermined algorithm. For example, a reference code can be generated by supplying to the algorithm, a number equal to the number of days since a predetermined date set at initialization. In either case, the reference code providing module of the control module provides a reference code 22, whether it be from memory or one generated in real time, to a comparator.

In a parallel step 23, a code may be received from a user. This may occur at any time prior to a present payment deadline without causing interruption of the ignition. A user having made a timely payment, that payment having been properly received and logged in the payment center, is entitled disclosure of the code enables or re-enables the automobile. In exemplary embodiments, a user mails a payment to the payment center in advance of the deadline. When enough time has passed for the center to have received and processed the payment, the user can contact the payment center, for example, by telephone to identify the loan. In response, the payment center can check its database and verify receipt of payment. After verification, the payment center will disclose to the user the code which enables or re-enables the automobile. Having the code, the user can then enter it via the user interface of the device. Thus, in methods of the invention, a code from a user can be received at a user interface.

A comparison of codes 24 is made in the control module upon receipt of a code entry from a user. The control module 38 is triggered to perform a comparison of codes. The reference code which corresponds to an immediate payment deadline is compared to the code entered by the user. Either of two results drives the next step. If there is agreement between the codes, the control module leaves the ignition enabled 25 without interruption. If there is no agreement between the user entered code and the reference code, then the control module operates the disabling module to cause the ignition to be disabled 26.

It is important to note that if agreement exists between the entered and reference codes, the result of the comparison step sets a positive indicator in the control module, which indicator must be present at the occurrence of the payment deadline in order to avoid causing the automobile to be disabled by, for example, interrupting the ignition circuit of the automobile.

Figure 3:
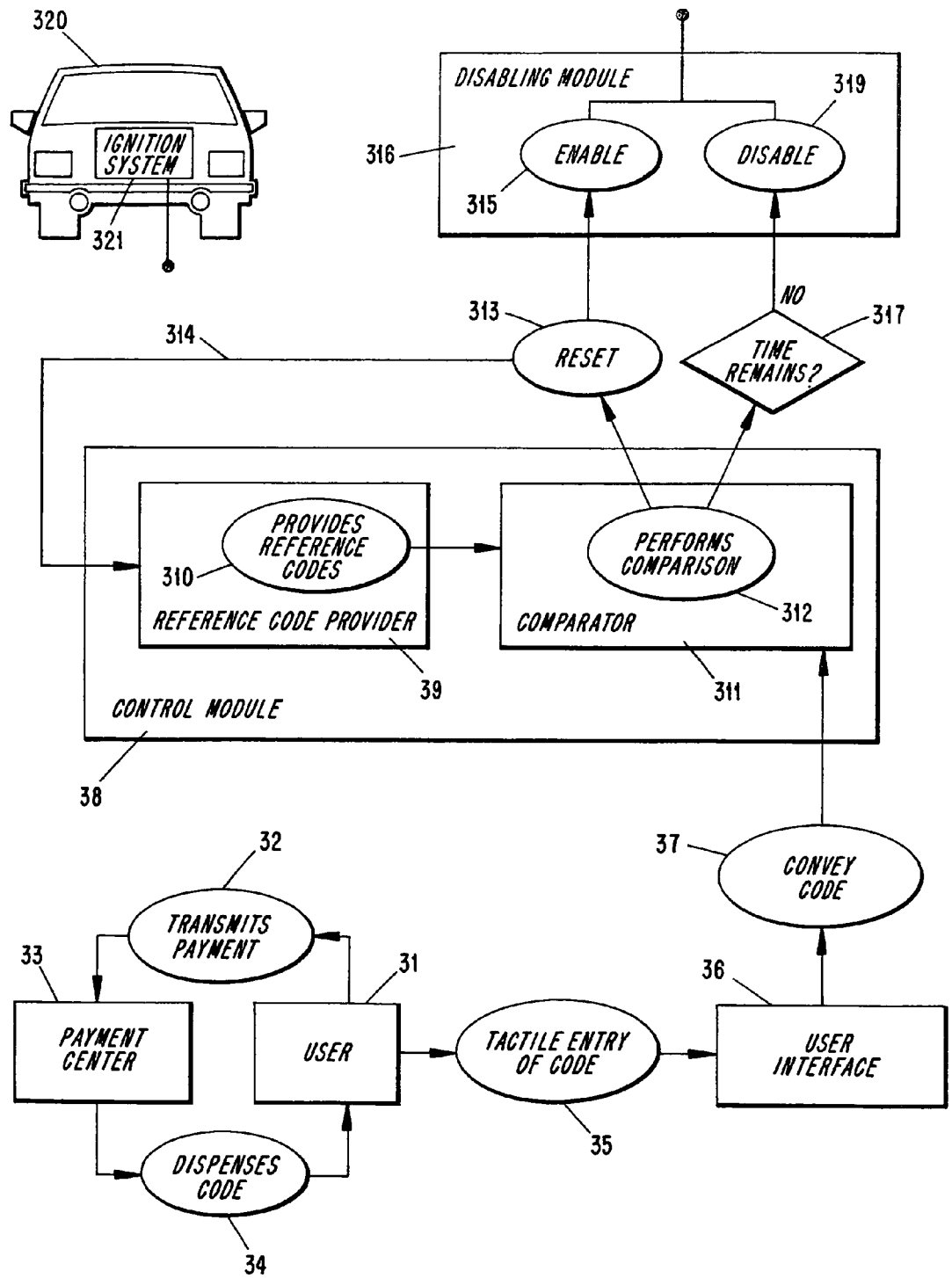
FIG. 3 is a block diagram that relates methods and systems of the present invention together.

FIG. 3 illustrates one exemplary embodiment of the present invention with more precision where steps of methods are shown in their relationships with elements of devices. A user 31 causes a payment to be transmitted 32 to a payment center 33 where it is received and logged into records. In response to receipt of that payment, the payment center dispenses 34 a predetermined code to the user. The user then enters 35, for example, the code via tactile entry upon a user interface 36 such as a simple keypad device. The user interface conveys 37 the code to the comparator portion of a control module 39. A reference code provider 39 provides 310 a reference code to the comparator 311. A comparison operation 312 is made to arrive at either of two distinct results. Either agreement is found with regard to the reference code and the code entered by the user, or no agreement is found. In the case of agreement, a reset operation 313 sends feedback 314 to the reference code provider to determine a new reference code which corresponds to the next payment deadline, while an enable 315 step causes the disablement module 316 to be operated such that the automobile is enabled without regard to its prior state. The comparison performed by the comparator can be one which tests for coincidence between codes or one which tests for cooperation between codes. For example, if the codes are identical, a binary "1" can be returned by the comparator. Alternatively, if the codes are different, but cooperate under a particular set of rules, a binary "1" can also be returned by the comparator.

In the case where agreement is not found, an agreement indicator is left in a negative state. On arrival of a payment due deadline or end of a grace period, a check of the state of the indicator is made. If the indicator is in a negative state, the disablement module is operated to cause the automobile to be disabled 319 by, for example, causing the ignition to be disabled. Devices of the invention may be coupled to an automobile 320 having a standard ignition 321.

In exemplary embodiments of the present invention, when a payment deadline passes, a grace period begins. During the grace period, the user is notified via an indicator, for example a visual or an audio signal or other alarm, that the grace period has been activated. During the grace period, the automobile remains operable and the ignition is not interrupted. However, the indicator serves as a warning of the impending interruption in service. If the grace period is exceeded and the proper code has still not been entered, then the automobile is disabled. This embodiment is considered a mere subset of the above described systems. The grace period being a limited extension of time before interruption of the ignition occurs.

Although, the exemplary embodiments discussed herein are primarily directed to automobiles, one will appreciate that other types of equipment can used with the present invention. For example, the present invention is also operable on other motor vehicles such as trucks, tractors, cranes, boats, jet-skis, snowmobiles, motorcycles, recreational vehicles, airplane, and the like. In addition, the present invention can be used with any electrical/mechanical equipment. For example, an air conditioner can have a device installed which implements the present invention. In this case, the control module can interrupt the compressor, fan, and/or control panel of the air conditioner if the control module fails to receive a code or signal that indicates that further use of the air conditioner is permitted. In addition, the equipment can be an elevator in which the control module can interrupt operation of the elevator. Further, medical equipment, such as Magnetic Resonance Imaging (MRI) or Computer Axial Tomography (CAT) equipment, that typically is leased or is subject to a security interest, can be equipped with a device practicing the present invention such that the control module can disable the equipment upon the failure of the user to satisfy the terms of the rental or lease agreement. The present invention can, of course, be applied to other types of equipment.

Alternative versions exist where the user interface is made redundant and is omitted entirely. For example, in equipment such as a vehicles, medical equipment, elevators, air conditioners, or other consumer products, a user interface can be eliminated and the system made automatic. A standard landline telephone interface can be installed into the equipment. Complete installation of the equipment includes plugging an active telephone line into the telephone interface. In this way, the control module of the equipment is put into communication with the payment center (e.g., a modem, DTMF tones, or other computer recognizable commands). The equipment can automatically be put into communication with the payment center on a periodic basis to receive codes which can be made available in response to receipt of payments. In an alternative embodiment, a wireless interface, such as a cellular telephone, pager, other radio frequency, can be used instead of the standard landline telephone jack to convey the codes from the payment center to the control module. Furthermore, since the equipment is in communication with the payment center, the payment center can send an enable signal or a disable signal to enable or disable the device, respectively.

One will now fully appreciate how the present invention operates to encourage timely loan or rental payments by disabling equipment subject to loan or lease agreements. Further, the present invention can be reset remotely and does not require being physically present at a payment center to be properly reset. Although the present invention has been described in considerable detail with clear and concise language and with reference to certain exemplary embodiments thereof including the best mode anticipated by the inventors, other versions are possible. Therefore, the spirit and scope of the invention should not be limited by the description of the exemplary embodiments contained therein, but rather by the claims appended hereto.

What is claimed is:

1. A method of enabling and disabling a vehicle in response to payments being timely made, comprising the steps:

a) computing a payment due deadline;
b) generating a reference code which corresponds to said deadline;
c) providing said reference code to a comparator;
d) receiving, via a keypad at the vehicle, an additional code;
e) passing said additional code to said comparator;
f) comparing said additional code with said reference code;
g) disabling said vehicle if agreement between said additional code and said reference code is not detected prior to said payment due deadline;
h) enabling said vehicle if agreement between said additional code and said reference code is detected, wherein said disabling step disables a system which supports causing ignition in an engine of said vehicle, said system includes only components not dedicated to directly causing a spark to initiate combustion; and
generating a next reference code which corresponds to the next payment due deadline if an agreement is found between said additional code and said reference code.

2. The method of claim 1, wherein said computing of a payment due deadline further comprises computing a payment deadline in agreement with terms of a loan formula having parameters selected from the group consisting of: total number of payments, payment period, grace period, start date, and combinations thereof.

3. A method of enabling and disabling equipment in response to payments being timely made, comprising the steps:
a) computing a payment due deadline;
b) generating a reference code which corresponds to said deadline;
c) providing said reference code to a comparator;
d) receiving, via a keypad at the equipment, an additional code;
e) passing said additional code to said comparator;
f) comparing said additional code with said reference code;
g) disabling said equipment if agreement between said additional code and said reference code is not detected prior to said payment due deadline; and
h) enabling said equipment if agreement between said additional code and said reference code is detected, wherein said computing of a payment due deadline further comprises computing a payment deadline in agreement with terms of a loan formula having parameters selected from the group consisting of: total number of payments, payment period, grace period, start date, and combinations thereof, and wherein said computing a payment due deadline step is performed in an initialization process where a host computing apparatus is connected to a client computing apparatus, the host computing apparatus providing the client computing apparatus with a database including a plurality of payment due deadline data elements.

4. The method of claim 2, wherein said computing a payment due deadline is performed by a control module periodically throughout the life of the loan.

5. The method of claim 1, wherein generating a reference code occurs in an initialization process wherein a set of reference codes are computed together and provided to an apparatus as a data set.

6. The method of claim 1, wherein generating a reference code occurs in a control module periodically.

7. The method of claim 1, wherein said comparing step includes determining if a correspondence between said additional code and said reference code exist.

8. The method of claim 1, wherein said disabling said vehicle causes a critical system of said vehicle to be disabled.

9. The method of claim 1, wherein said disabling step partially disables said vehicle.

10. The method of claim 1, wherein said enabling step releases a disabled critical system from its disabled state.

11. The method of claim 1, wherein said enabling step leaves an operable critical system in an operable condition.

12. A system for enabling and disabling a vehicle in response to timely payments being made comprising:
a disabling module connected to said vehicle;
a control module in communication with said disabling module;
a keypad at the vehicle; and
means for periodically receiving a code corresponding to a payment deadline and transmitting said code to said control module, wherein said disabling module is connected to, and disables, a system which supports causing ignition in an engine of said vehicle, said system includes only components not dedicated to directly causing a spark to initiate combustion.

13. The system of claim 12, wherein said control module comprises:
a comparator; and
a reference code providing module, said comparator being operable for comparing reference codes with received codes and triggering events in response thereto, and
said reference code providing module being operable for periodically providing reference codes to said comparator wherein said reference codes correspond to payments which are to be made.

14. A method for enabling and disabling a vehicle comprising the steps of:
computing at least one deadline;
generating a first code for each at least one deadline;
receiving, via a keypad at the vehicle, a second code;
comparing said first code with said second code;
disabling said vehicle if said comparing step determines that said first code and said second code are not in agreement prior to said at least one deadline; and
enabling said vehicle if said comparing step determines that said first code and said second code are in agreement, wherein said disabling step disables a system which supports causing ignition in an engine of said vehicle, said system includes only components not dedicated to directly causing a spark to initiate combustion.

15. The method of claim 14, wherein said deadline corresponds with a payment due date for a loan or lease agreement.

16. The method of claim 14, wherein said disabling step disables a critical system of said equipment.

17. The method of claim 14, wherein said disabling step partially disables said vehicle.

18. A method for enabling and disabling equipment comprising the steps of:
computing at least one deadline;
generating a first code for each at least one deadline;
receiving, via a keypad at the equipment, a second code;
comparing said first code with said second code;
disabling said equipment if said comparing step determines that said first code and said second code are not in agreement prior to said at least one deadline; and enabling said equipment if said comparing step determines that said first code and said second code are in agreement, wherein each first code is unique.

19. A method for enabling and disabling equipment comprising the steps of:
computing at least one deadline;
generating a first code for each at least one deadline;
receiving a second code;
comparing said first code with said second code;
disabling said equipment if said comparing step determines that said first code and said second code are not in agreement prior to said at least one deadline; and
enabling said equipment if said comparing step determines that said first code and said second code are in agreement, wherein said receiving step receives said second code from a portable device.

20. A system for enabling and disabling a vehicle comprising:
a disabling module connected to said vehicle;
a control module in communication with said disabling module; and
means for periodically receiving a code and transmitting said code to said control module, wherein said means for periodically receiving a code and transmitting said code is a keypad at the vehicle,
wherein said disabling module disables said vehicle when said code is not in agreement with a reference code before a predetermined time exceeds a predetermined deadline, wherein said disabling module is connected to, and disables, a system which supports causing ignition in an engine of said vehicle, said system includes only components not dedicated to directly causing a spark to initiate combustion, and wherein the reference code is based on a payment due date.

21. The system of claim 20, wherein said disabling module enables said vehicle when said code is in agreement with said predetermined reference code.

22. The system of claim 20, wherein said control module comprises:
a comparator; and
a reference code providing module, said comparator being operable for comparing a reference code with a received code, and
said reference code providing module being operable for providing a plurality of reference codes to said comparator, wherein each reference code corresponds to a predetermined deadline, respectively.

23. The system of claim 20, wherein said keypad converts tactile input to digital code.

24. The system of claim 20, wherein said equipment includes electrical components.

25. A method for improving timely payments by controlling the state of operability of a vehicle, the method comprising:
generating a code, the code being associated with a payment due deadline;
receiving a code from a keypad at the vehicle;
processing the code received from the keypad;
permitting operation of the vehicle if the processing of the code received from the keypad results in verification of the code received from the keypad prior to the expiration of the payment due deadline, wherein if the processing does not result in verification of the code received from the keypad, the vehicle is at least partially disabled, wherein partial disablement includes disabling a system which supports causing ignition in an engine of the vehicle, the system including only components not dedicated to directly causing a spark to initiate combustion.

26. The method of claim 25, wherein the code is generated using an algorithm.

27. The method of claim 25, wherein the payment due deadline is a date when a payment is due in accordance with a loan agreement.

28. The method of claim 25, wherein the payment due deadline is a date when a payment is due in accordance with a loan agreement plus a grace period.

29. The method of claim 25, further comprising:
receiving an emergency code from the keypad;
processing the emergency code received from the keypad;
permitting operation of the equipment if the processing of the emergency code received from the keypad results in verification of the emergency code received from the keypad prior to the expiration of the payment due deadline, wherein if the processing does not result in verification of the emergency code received from the keypad, the vehicle is at least partially disabled.

30. The method of claim 29, wherein use of the emergency code is limited to a fixed amount.

31. The method of claim 29, wherein a verified emergency code temporarily re-enables the equipment.

32. The method of claim 29, wherein the code is generated using the payment due deadline.

33. A method for improving timely payments by controlling the state of operability of a vehicle, the method comprising:
generating a code, the code being associated with a payment due deadline;
receiving a code from a keypad at the vehicle;
verifying the code received from the keypad;
permitting operation of the vehicle if the code received from the keypad is verified prior to the expiration of the payment due deadline, wherein if the code received from the keypad is not verified, the vehicle is at least partially disabled, wherein partial disablement includes disabling a system which supports causing ignition in an engine of the vehicle, the system including only components not dedicated to directly causing a spark to initiate combustion.

34. The method of claim 33, wherein the code is generated using an algorithm.

35. The method of claim 33, wherein the payment due deadline is a date when a payment is due in accordance with a loan agreement.

36. The method of claim 33, wherein the payment due deadline is a date when a payment is due in accordance with a loan agreement plus a grace period.

37. The method of claim 33, further comprising:
receiving an emergency code from a keypad;
verifying the emergency code received from the keypad;
permitting operation of the vehicle if the emergency code received from the keypad is verified prior to the expiration of the payment due deadline, wherein if the emergency code received from the keypad is not verified, the vehicle is at least partially disabled.

38. The method of claim 37, wherein use of the emergency code is limited to a fixed amount.

39. The method of claim 37, wherein a verified emergency code temporarily re-enables the vehicle.

40. The method of claim 33, wherein the code is generated using the payment due deadline.

41. A method of enabling and disabling a vehicle in response to payments being timely made, comprising:

a) computing a payment due deadline;
b) generating a reference code which corresponds to said deadline;
c) providing said reference code to a comparator;
d) receiving, via a keypad at the vehicle, an additional code;
e) passing said additional code to said comparator;
f) comparing said additional code with said reference code;
g) disabling said vehicle if agreement between said additional code and said reference code is not detected prior to said payment due deadline; and
h) enabling said vehicle if agreement between said additional code and said reference code is detected,
wherein said disabling step disables a system which supports causing ignition in an engine of said vehicle, said system includes only components not dedicated to directly causing a spark to initiate combustion, and
wherein said computing of a payment due deadline further comprises computing a payment deadline in agreement with terms of a loan formula having parameters selected from the group consisting of: total number of payments, payment period, grace period, start date, and combinations thereof, and wherein said computing a payment due deadline step is performed after an initialization process of a device which controls enabling and disabling of the vehicle;
i) generating a next reference code which corresponds to the next payment due deadline if an agreement is found between the additional code and the reference code.

42. The method of claim 41, further comprising:
repeating steps a–h for another payment due deadline, using another reference code and another additional code.

43. The method of claim 42, wherein the reference code is generated using an algorithm.

44. The method of claim 43, wherein the algorithm generates the reference code using a number of days since a predetermined date set during the initialization process.

45. A method of enabling and disabling equipment in response to payments being timely made, comprising the steps:
a) computing a payment due deadline;
b) generating a reference code which corresponds to said deadline;
c) providing said reference code to a comparator;
d) receiving, via a keypad at the equipment, an additional code;
e) passing said additional code to said comparator;
f) comparing said additional code with said reference code;
g) disabling said equipment if agreement between said additional code and said reference code is not detected prior to said payment due deadline; and
h) enabling said equipment if agreement between said additional code and said reference code is detected,
wherein said disabling step disables a system which supports causing ignition in an engine of said vehicle, said system includes only components not dedicated to directly causing a spark to initiate combustion,
wherein said computing of a payment due deadline further comprises computing a payment deadline in agreement with terms of a loan formula having parameters selected from the group consisting of: total number of payments, payment period, grace period, start date, and combinations thereof.
wherein said computing a payment due deadline step is performed in an initialization process where a host computing apparatus is connected to a client computing apparatus, the host computing apparatus providing the client computing apparatus with a database including a plurality of payment due deadline data elements and reference codes, and
wherein said method repeats steps a–h using each of the plurality of payment due deadline data elements and reference codes.

* * * * *